(12) United States Patent
Klingbeil et al.

(10) Patent No.: US 6,862,881 B1
(45) Date of Patent: Mar. 8, 2005

(54) METHOD AND APPARATUS FOR CONTROLLING REGENERATION OF A PARTICULATE FILTER

(75) Inventors: David M. Klingbeil, Pekin, IL (US); Michael P. Withrow, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/729,125

(22) Filed: Dec. 5, 2003

(51) Int. Cl.$^7$ ................................................ F01N 3/00
(52) U.S. Cl. ........................... 60/295; 60/274; 60/276; 60/284; 60/286; 60/297
(58) Field of Search .......................... 60/274, 276, 285, 60/286, 295, 297, 303, 311, 284

(56) References Cited

U.S. PATENT DOCUMENTS

| | | | |
|---|---|---|---|
| 4,395,875 A | | 8/1983 | Virk |
| 4,452,040 A | | 6/1984 | Kobashi |
| 4,665,690 A | | 5/1987 | Nomoto et al. |
| 4,881,369 A | | 11/1989 | Kanesaki |
| 5,050,376 A | | 9/1991 | Stiglic et al. |
| 5,207,990 A | * | 5/1993 | Sekiya et al. ............... 422/183 |
| 5,479,775 A | | 1/1996 | Kraemer et al. |
| 5,711,149 A | * | 1/1998 | Araki ........................ 60/278 |
| 5,826,425 A | | 10/1998 | Rossi Sebastiano et al. |
| 5,839,273 A | * | 11/1998 | Maus ......................... 60/274 |
| 5,947,080 A | | 9/1999 | Weissman et al. |
| 5,956,942 A | | 9/1999 | Sebastiano et al. |
| 6,041,591 A | | 3/2000 | Kaneko et al. |
| 6,230,689 B1 | | 5/2001 | Tengroth et al. |
| 6,250,074 B1 | | 6/2001 | Suzuki et al. |
| 6,253,543 B1 | | 7/2001 | Russell |
| 6,304,815 B1 | | 10/2001 | Moraal et al. |
| 6,314,722 B1 | | 11/2001 | Matros et al. |
| 6,412,276 B1 | * | 7/2002 | Salvat et al. .................. 60/295 |
| 6,568,177 B1 | | 5/2003 | Surnilla |
| 6,574,956 B1 | | 6/2003 | Moraal et al. |
| 6,594,990 B2 | * | 7/2003 | Kuenstler et al. ............. 60/295 |
| 6,604,504 B2 | | 8/2003 | Surnilla et al. |
| 2001/0010151 A1 | | 8/2001 | Russell |
| 2002/0194843 A1 | | 12/2002 | Ootake |
| 2003/0033800 A1 | | 2/2003 | Tonetti et al. |
| 2003/0046929 A1 | * | 3/2003 | Terada et al. ................. 60/286 |
| 2003/0121249 A1 | | 7/2003 | Foster et al. |
| 2004/0035101 A1 | * | 2/2004 | Imai et al. .................... 60/295 |
| 2004/0074225 A1 | * | 4/2004 | Schaller et al. ............... 60/274 |

FOREIGN PATENT DOCUMENTS

| | | |
|---|---|---|
| EP | 0784738 B1 | 5/1998 |
| EP | 1281852 A2 | 2/2003 |
| EP | 1304458 A1 | 4/2003 |
| EP | 1281852 A3 | 11/2003 |
| JP | 61093236 A2 | 5/1986 |
| JP | 2000161044 A2 | 6/2000 |
| JP | 2001115822 A2 | 4/2001 |

\* cited by examiner

*Primary Examiner*—Tu M. Nguyen
(74) *Attorney, Agent, or Firm*—Clifton Green; Finnegan, Henderson, Farabow, Garrett & Dunner

(57) ABSTRACT

Apparatuses and methods for regenerating a particulate filter. A first temperature corresponding to a temperature of a catalyst that is thermally coupled with a particulate filter is determined. A second temperature corresponding to the temperature of the particulate filter is determined. Substantially no unburned hydrocarbons are delivered to the catalyst when the first temperature is below a first threshold and unburned hydrocarbons are delivered to the catalyst when the first temperature is above the first threshold and the second temperature is below a second threshold.

19 Claims, 2 Drawing Sheets

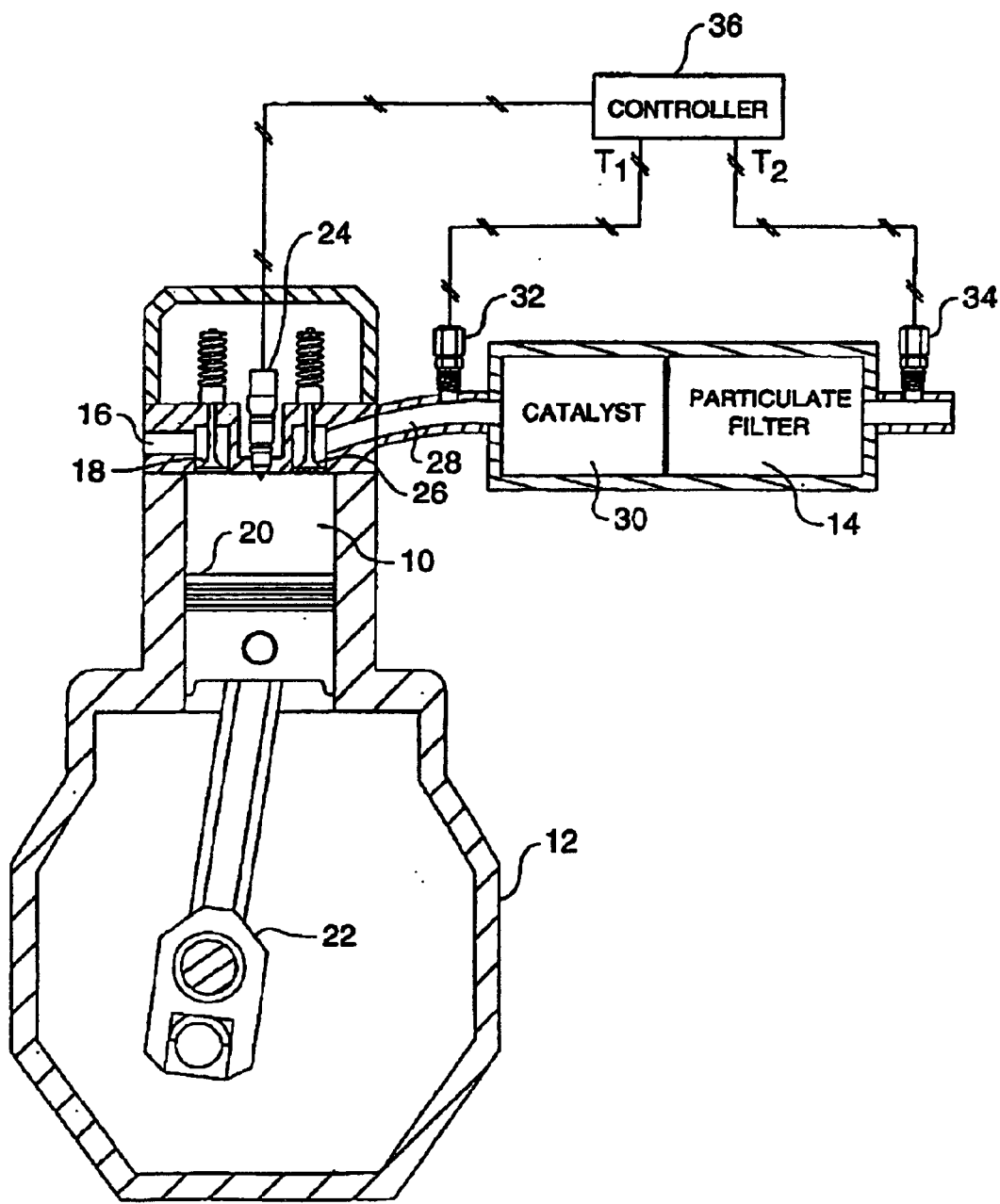
Fig_1_

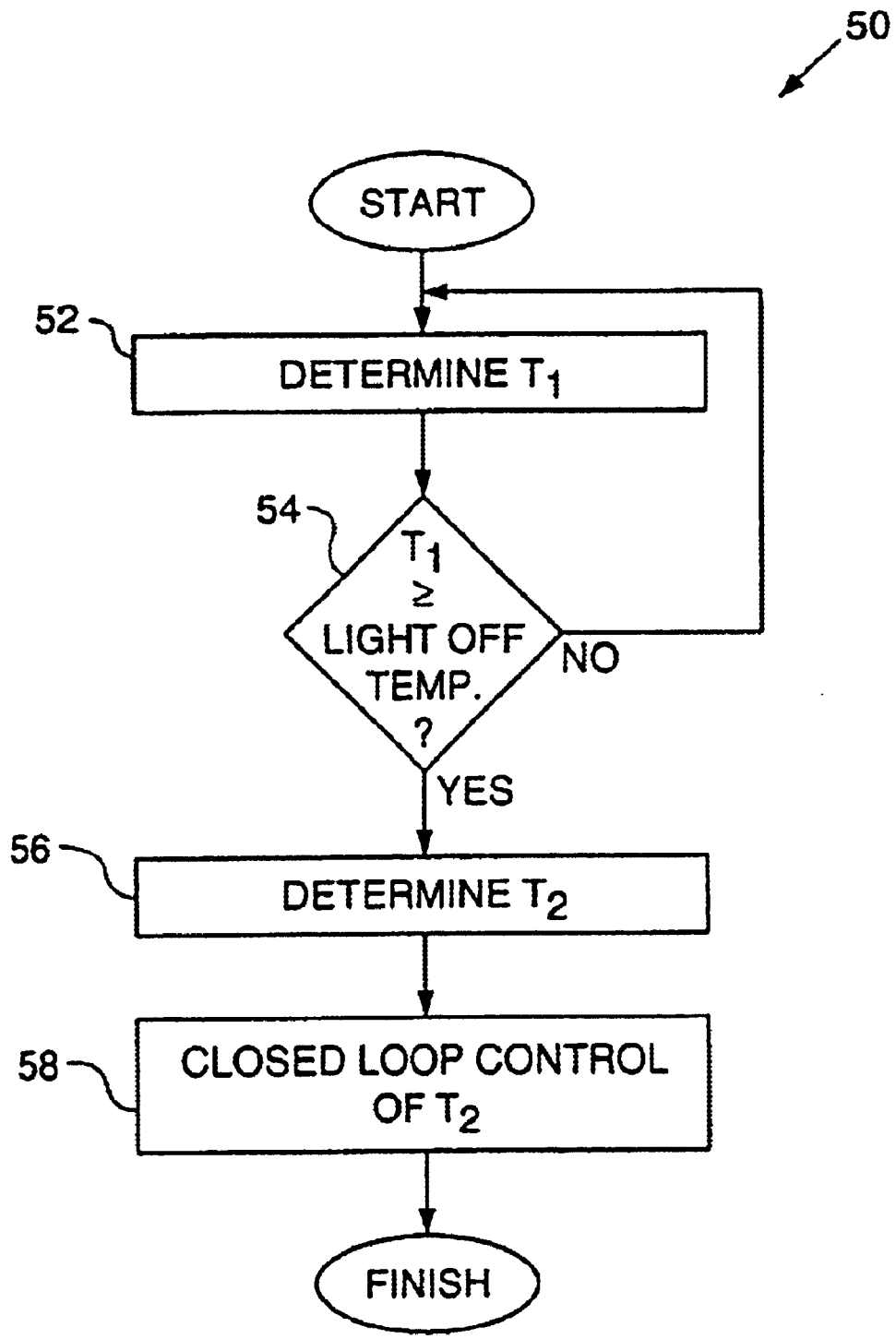
Fig-2-

METHOD AND APPARATUS FOR CONTROLLING REGENERATION OF A PARTICULATE FILTER

TECHNICAL FIELD

This invention relates generally to particulate filters, and more particularly, to controlling the regeneration of particulate filters.

BACKGROUND

Particulate filters for engine exhaust are gaining importance as engine manufacturers seek to reduce emissions. Particulate filters are used to filter out particulate matter from the engine's exhaust stream, and to periodically regenerate when the filter reaches a certain degree of clogging. Regeneration of the filter is typically accomplished by increasing the temperature of the particulate filter to a point where the accumulated particulates are burned off, thereby unclogging the filter.

Catalysts of various compositions are frequently used to elevate the temperature of the particulate filter. Catalysts, however, typically only function well when they are above their respective "light off" temperature. The "light off" temperature for a catalyst is typically a temperature above which the catalyst is able to convert unburned hydrocarbons at some predetermined efficiency. Typically at temperatures below the "light off" temperature the catalyst converts a negligible amount of hydrocarbons, while at temperatures above the "light off" temperature, the catalyst may operate at a substantially higher efficiency.

The unburned hydrocarbons may be delivered to the catalyst through a variety of ways, such as, for example, injecting a shot of diesel fuel after substantial combustion within a cylinder has occurred. The diesel fuel then exits the cylinder through the exhaust valve and reaches the catalyst in relatively unchanged form.

Control of the temperatures of the catalyst and particulate filter have been relatively crude, and a better techniques and devices for performing this function are desired.

SUMMARY OF THE INVENTION

The present invention provides apparatuses and methods for regenerating a particulate filter. A first temperature corresponding to a temperature of a catalyst that is thermally coupled with a particulate filter is determined. A second temperature corresponding to the temperature of the particulate filter is determined. Substantially no unburned hydrocarbons are delivered to the catalyst when the first temperature is below a first threshold and unburned hydrocarbons are delivered to the catalyst when the first temperature is above the first threshold and the second temperature is below a second threshold.

BRIEF DESCRIPTION OF THE DRAWINGS

FIG. 1 is a side view of a cylinder of an engine along with an associated particulate filter and control devices therefore according to one embodiment of the invention.

FIG. 2 is a flow chart according to one embodiment of the invention.

DETAILED DESCRIPTION

FIG. 1 is a side view of a cylinder 10 of an engine 12 along with an associated particulate filter 14 and control devices therefore according to one embodiment of the invention. Although only a single cylinder 10 is shown for purposes of illustration, the invention may be equally applicable to multi-cylinder engines, as well as rotary-engines. The invention may be practiced in both two and four stroke combustion cycles. The engine 12 includes an intake air passageway 16 and at least one intake valve 18 disposed in the intake air passageway and operable to fluidly connect the intake air passageway 16 with the cylinder 10 by ways known to those skilled in the art.

A piston 20 may be disposed within the cylinder 10 and reciprocates, delivering power to a crank shaft 22 during the combustion cycle by ways known to those skilled in the art.

A fuel delivery device, such as a fuel injector 24 may be fluidly coupled with the cylinder 10 to provide a combustible fuel as a function of a control signal ("CONTROL") by ways known to those skilled in the art. The fuel injector 24 may also serve as a hydrocarbon delivery system as will be described further below. Other types of hydrocarbon delivery systems delivering the same or other sources of hydrocarbons may be used in addition to or instead of fuel injector 24 as will become evident from the below description. Any of a variety of hydrocarbons known to those skilled in the art may be delivered, such as, gasoline, natural gas, kerosene, and crude oil. Furthermore, in other embodiments of the invention, an extra in-exhaust fuel injector (not shown) or other hydrocarbon delivery device could be used to deliver the hydrocarbons in lieu of or in addition to the fuel injector 24.

At least one exhaust valve 26 may be fluidly coupled with the cylinder 10 and may be operable to couple the cylinder 10 with an exhaust path 28 by ways known to those skilled in the art.

A catalyst 30 may be coupled with the exhaust path 28 to receive exhaust gases from the cylinder 10. The catalyst 30 is typically selected to convert hydrocarbons ("HC") to heat by ways known to those skilled in the art. The catalyst 30 may be any of a variety of materials known to those skilled in the art.

The catalyst 30 typically has a "light-off" temperature. The "lightoff" temperature is typically a temperature at which the catalyst converts a desired percentage of hydrocarbons to heat, e.g., a particular efficiency.

A first temperature sensor 32 may be thermally coupled with the catalyst 30 to determine a first temperature ("T1") indicative of a temperature of the catalyst 30. The first temperature sensor 32 may be operable to transmit a first temperature signal as a function of the first temperature. As a practical matter, the first temperature sensor 32 may be disposed in the exhaust path 28 in close proximity to the catalyst 30. Other locations that provide a temperature correlated to the temperature of the catalyst 30 may also be used.

The particulate filter 14 is typically thermally coupled with the catalyst 30. The particulate filter 14 is operable to filter particulate matter from the exhaust gases emitted from the cylinder 10 by ways known to those skilled in the art.

During filtration, the particulate filter 14 accumulates the particulate matter from the exhaust gas. Over time, the particulate filter 14 may become partially or completely clogged and require regeneration.

Regeneration of the particulate filter 14 may be achieved by elevating the temperature of the particulate filter to a temperature sufficient to burn-off the accumulated particulates. This temperature is typically 450–600 degrees Celsius, although the range may vary.

A second temperature sensor 34 may be thermally coupled with the particulate filter 14 to determine a second temperature indicative of a temperature of the particulate filter. The second temperature sensor 34 may be operable to transmit a second temperature signal as a function of the second temperature. As a practical matter, the second temperature sensor 34 may be disposed in the exhaust path 28 in close proximity to the particulate filter 14. Other locations that provide a temperature correlated to the temperature of the particulate filter 14 may also be used.

A regeneration controller 36, such as an electronic engine control module ("ECM") or fuel injector control module, may be coupled with the first and second temperature sensors to receive the first and second temperature signals. The regeneration controller 36 may be any of a variety of type of ECM's known to those skilled in the art. The controller 36 may be operable to transmit the control signal CONTROL as a function of the first and second temperature signals, as will be further explained below.

The regeneration controller may be further operable to determine, or receive a signal indicative of, when regeneration of the particulate filter 14 is desired. This may be accomplished by any of a variety of ways known to those skilled in the art.

In operation, when regeneration of the particulate filter 14 is desired, the regeneration controller 36 causes the hydrocarbon delivery system to deliver unburned hydrocarbons to the catalyst 30. In the illustrated example, the regeneration controller 36 transmits an appropriate control signal CONTROL to fuel injector 24 to cause the fuel injector 24 to inject fuel in the form of a second shot, for example, into the cylinder late in the combustion cycle, or after significant or all of the conventional combustion occurs.

When the exhaust valve 24 opens during the exhaust stroke, the fuel, a.k.a unburned hydrocarbons, passes into the exhaust path 28, and to the catalyst 30. The unburned hydrocarbons cause the catalyst 30 to heat up, thereby heating the particulate filter 14 to a temperature that burns off at least some of the accumulated particulates, regenerating the particulate filter 14. The temperature of the particulate filter may be held at this regeneration temperature for as long as desired, typically until the majority of accumulated particulates have been burned off.

In one embodiment of the invention, it may be desirable to only deliver unburned hydrocarbons to the catalyst 30 when the first temperature T1 is above the "light-off" temperature of the catalyst. This prevents unburned hydrocarbons from passing through the catalyst by virtue of the fact that they are not converted to heat, and out into the atmosphere.

The regeneration controller 36 may also be used for closed loop control of the second temperature T2. By determining the second temperature T2, the regeneration controller 36 may control the amount of hydrocarbons delivered into the exhaust stream, and thereby to the catalyst. Typically the more hydrocarbons delivered, the hotter the catalyst 30 will get, and the hotter the particulate filter and the second temperature T2 will get. Similarly, if the second temperature T2 should become higher than desired, the regeneration controller 36 can reduce the amount of hydrocarbons delivered into the exhaust stream and to the catalyst 30.

FIG. 2 is a flow chart 50 according to one embodiment of the invention. In block 52 the first temperature T1 corresponding to the temperature of the catalyst 30 is determined.

In block 54, the first temperature T1 is compared with the "lightoff" temperature of the catalyst 30. If the first temperature T1 is not greater than or equal to the "light-off" temperature, control passes back to block 52. If the first temperature T1 is greater than or equal to the "light-off" temperature, control passes to block 56.

In block 56, the second temperature T2 corresponding to the temperature of the particulate filter 14 is determined.

In block 58, the second temperature T2 is controlled via a closed loop control system to a desired temperature, such as the regeneration temperature of the particulate filter. The closed loop system may be any of a variety of closed loop control systems known to those skilled in the art.

INDUSTRIAL APPLICABILITY

Embodiments of the invention may be used to control the regeneration of a particulate filter using a catalyst and unburned hydrocarbons. By monitoring the first temperature T1, the regeneration controller 36 can ensure that unburned hydrocarbons are only added to the exhaust stream during conditions allowing the catalyst 30 to convert them to heat. In addition, the regeneration controller 36 can use the second temperature T2 as feedback to ensure that the proper amount of hydrocarbons are added to the exhaust path to achieve and maintain the particulate filter at a temperature that will cause regeneration.

From the foregoing it will be appreciated that, although specific embodiments of the invention have been described herein for purposes of illustration, various modifications may be made without deviating from the spirit or scope of the invention. Accordingly, the invention is not limited except as by the appended claims.

What is claimed is:

1. A method for regenerating a particulate filter, comprising:
    determining a first temperature corresponding to a temperature of a catalyst that is thermally coupled with a particulate filter;
    determining a second temperature corresponding to the temperature of the particulate filter;
    delivering substantially no unburned hydrocarbons to the catalyst when the first temperature is below a first threshold temperature;
    delivering unburned hydrocarbons to the catalyst when the first temperature is above the first threshold temperature and the second temperature is below a second threshold temperature; and
    delivering reduced hydrocarbons to the catalyst when the second temperature is above a third threshold temperature different from the second threshold temperature.

2. The method of claim 1 wherein delivering unburned hydrocarbons to the catalyst comprises delivering at least one of a diesel fuel, gasoline, natural gas, kerosene, and crude oil to the catalyst.

3. The method of claim 1 wherein the first threshold temperature comprises a "light-of" temperature for the catalyst.

4. The method of claim 1 wherein the second threshold temperature comprises a temperature operable to regenerate the particulate filter.

5. A method for regenerating a particulate filter, comprising:
    determining a first temperature corresponding to a catalyst that is thermally coupled with a particulate filter;
    determining a second temperature corresponding to the temperature of the particulate filter; and
    performing closed loop control of the second temperature when the first temperature is above a first threshold, the closed loop control including delivering unburned hydrocarbons to the catalyst when the first temperature is above the first threshold temperature and the second temperature is below a second threshold temperature, and delivering reduced hydrocarbons to the catalyst when the second temperature is above a third threshold temperature different from the second threshold temperature.

6. The method of claim 5 wherein performing closed loop control of the second temperature comprises controlling the second temperature to substantially a predetermined temperature.

7. The method of claim 6 wherein the predetermined temperature comprises a temperature operable to regenerate the particulate filter.

8. The method of claim 5 wherein performing closed loop control of the second temperature comprises controlling the second temperature to substantially a predetermined range of temperatures.

9. The method of claim 8 wherein the predetermined range of temperatures comprises a range of temperatures operable to regenerate the particulate filter.

10. An apparatus for regenerating a particulate filter, comprising:
 a catalyst;
 a first temperature sensor operable to determine a first temperature corresponding to a temperature of the catalyst and to transmit a first temperature signal as a function thereof;
 a particulate filter thermally coupled with the catalyst;
 a hydrocarbon delivery system operable to deliver unburned hydrocarbons to the catalyst as a function of a first control signal;
 a second temperature sensor operable to determine a second temperature corresponding to a temperature of the particulate filter and to transmit a second temperature signal as a function thereof; and
 a regeneration controller coupled with the first and second temperature sensors to receive the first and second temperature signals and coupled with the hydrocarbon delivery system, the regeneration controller operable to:
  determine if the first temperature is above a first threshold temperature;
  transmit a first control signal to the hydrocarbon delivery system that is operable to cause the hydrocarbon delivery system to deliver substantially no unburned hydrocarbons to the catalyst when the first temperature is below the first threshold temperature;
  transmit a second control signal to the hydrocarbon delivery system that is operable to cause the hydrocarbon delivery system to deliver unburned hydrocarbons to the catalyst when the first temperature is above the first threshold temperature and the second temperature is below a second threshold temperature; and
  transmit a third control signal to the hydrocarbon delivery system to reduce the hydrocarbons delivered to the catalyst when the first temperature is above the first threshold temperature and the second temperature is above a third threshold temperature, the third threshold temperature being different from the second threshold temperature.

11. The apparatus of claim 1 wherein first threshold temperature comprises a light-off temperature of the catalyst.

12. The apparatus of claim 1 wherein the second threshold temperature comprises substantially a temperature operable to regenerate the particulate filter.

13. The apparatus of claim 1 wherein the third threshold temperature comprises a temperature of not more than approximately 625 to 675 degrees Celsius.

14. The apparatus of claim 1 wherein the hydrocarbon delivery system comprises a fuel injector.

15. An apparatus for regenerating a particulate filter, comprising:
 a catalyst;
 a first temperature sensor operable to determine a first temperature corresponding to a temperature of the catalyst and to transmit a first temperature signal as a function thereof;
 a particulate filter thermally coupled with the catalyst;
 a hydrocarbon delivery system operable to deliver unburned hydrocarbons to the catalyst as a function of a first control signal;
 a second temperature sensor operable to determine a second temperature corresponding to a temperature of the particulate filter and to transmit a second temperature signal as a function thereof; and
 a regeneration controller coupled with the first and second temperature sensors to receive the first and second temperature signals and coupled with the hydrocarbon delivery system, the regeneration controller operable to:
  determine if the first temperature is above a first threshold temperature;
  determine if the second temperature is above a second threshold temperature;
  transmit a control signal to the hydrocarbon delivery system that is operable to:
   cause the hydrocarbon delivery system to deliver substantially no unburned hydrocarbons to the catalyst when the first temperature is below the first threshold temperature;
   cause the hydrocarbon delivery system to increase the quantity of unburned hydrocarbons delivered to the catalyst when the first temperature is above the first threshold temperature and the second temperature is below the second threshold temperature; and
   cause the hydrocarbon delivery system to decrease the quantity of unburned hydrocarbons to the catalyst when the first temperature is above the first threshold temperature and the second temperature is above a third threshold temperature, the third threshold temperature being different from the second threshold temperature.

16. The apparatus of claim 15 wherein the second threshold temperature comprises substantially the third threshold temperature.

17. The apparatus of claim 15 wherein the first threshold temperature comprises substantially the light-off temperature of the catalyst.

18. The apparatus of claim 15 wherein the second threshold temperature comprises substantially a temperature operable to regenerate the particulate filter.

19. The apparatus of claim 15 wherein the hydrocarbon delivery system comprises a fuel injector.

* * * * *

UNITED STATES PATENT AND TRADEMARK OFFICE
CERTIFICATE OF CORRECTION

PATENT NO. : 6,862,881 B1
DATED : March 8, 2005
INVENTOR(S) : David M. Klingbeil et al.

It is certified that error appears in the above-identified patent and that said Letters Patent is hereby corrected as shown below:

Column 5,
Line 64, delete "1" and insert -- 10 --.

Column 6,
Lines 1, 4 and 7, delete "1" and insert -- 10 --.

Signed and Sealed this

First Day of November, 2005

JON W. DUDAS
*Director of the United States Patent and Trademark Office*